United States Patent [19]

Carre et al.

[11] 4,050,251
[45] Sept. 27, 1977

[54] HYDRAULIC BOOSTER

[75] Inventors: Jean-Jacques Carre, Montreuil; Roland Muterel, Bessancourt, both of France

[73] Assignee: Societe Anonyme D.B.A., Paris, France

[21] Appl. No.: 652,265

[22] Filed: Jan. 26, 1976

[30] Foreign Application Priority Data

Mar. 4, 1975 France .................. 75.06652

[51] Int. Cl.² ................... B60T 13/16; F15B 7/00
[52] U.S. Cl. ....................... 60/550; 60/567; 60/574; 60/582; 91/391 R; 92/62
[58] Field of Search ........... 91/411, 469, 424, 391 R; 92/62, 63, 65; 60/550, 567, 581, 582, 547, 589, 574, 577

[56] References Cited

U.S. PATENT DOCUMENTS

| | | | |
|---|---|---|---|
| 512,790 | 1/1894 | Bachman | 92/62 |
| 2,163,874 | 6/1939 | Goepfrich | 60/589 |
| 3,345,818 | 10/1967 | Milster | 60/581 X |
| 3,473,329 | 10/1969 | Eggstein | 60/581 X |
| 3,623,694 | 11/1971 | Goldberg | 92/65 X |
| 3,805,671 | 4/1974 | Carre | 91/391 R |
| 3,926,093 | 12/1975 | Nakagawa | 91/391 R |

*Primary Examiner*—Irwin C. Cohen
*Attorney, Agent, or Firm*—Paul David Schoenle; Ken C. Decker; William N. Antonis

[57] ABSTRACT

The invention relates to a hydraulic servomotor comprising a housing provided with a bore slidably receiving two pistons separating an actuating chamber from an utilization chamber, said pistons including an annular outer piston and an inner piston received within the annular piston. Releasable coupling means are provided between both pistons to permit said pistons to move in unison when high pressure fluid is available in the actuating chamber and to permit the inner piston to be moved alone by the push rod in the event of a high pressure failure in the actuating chamber. The motion of the outer piston towards the interior of the actuating chamber is limited by an abutment fixed to the housing.

8 Claims, 3 Drawing Figures

HYDRAULIC BOOSTER

The invention relates to a hydraulic servomotor, more particularly for a motor vehicle brake system.

Earlier proposals relate to a hydraulic servomotor comprising inside a housing piston means separating an actuating chamber from a utilization chamber, the piston means being movable towards the interior of the utilization chamber under the influence of a pressure prevailing in the actuating chamber, the pressure being controlled by a distributing valve connected to a high pressure source and to a reservoir, the distributing valve being moved by a mechanical transmission responsive to relative motion of a push rod and of the piston means, and the push rod being able to move the piston means in the event of a pressure failure in the actuating chamber.

A commoner problem of hydraulic servomotors for vehicle braking systems and in which the housing contains both an actuating and a utilization chamber separated by a piston means derives from the choice of a large piston means diameter in order to make the servomotor shorter. However, if there is a failure of high pressure, the driver must then exert very considerable force in order to move the piston means.

To overcome this disadvantage, the invention proposes a hydraulic servomotor comprising a housing provided with a bore slidably receiving piston means separating an actuating chamber from an utilization chamber, said piston means including an annular outer piston and an inner piston received within the annular piston, a distributing valve adapted to be connected to a high pressure source and to a reservoir and being actuated through the intermediary of an operator operatored push rod, releasable coupling means being provided between both pistons to permit both pistons to move in unisson when high pressure fluid is available in the actuating chamber and to permit the inner piston to be moved alone in response of a displacement of the push rod in the event of a high pressure failure of the actuating chamber, and abutment means fixed to the housing to limit motion of the annular piston towards the end of the bore adjacent to the actuating chamber.

With the invention, during normal operation, the utilization chamber can be pressurized by both pistons connected together to give a larger effective area than the inner piston alone and consequently, where the servomotor is used in a vehicle brake circuit, to give a shorter pedal stroke. When the assisted braking fails, moreover, the operating force required at the pedal to give the necessary braking pressure in the utilization chamber is still moderate.

The invention will now be described by way of example with reference to the accompanying drawings, in which.

Figure 1:
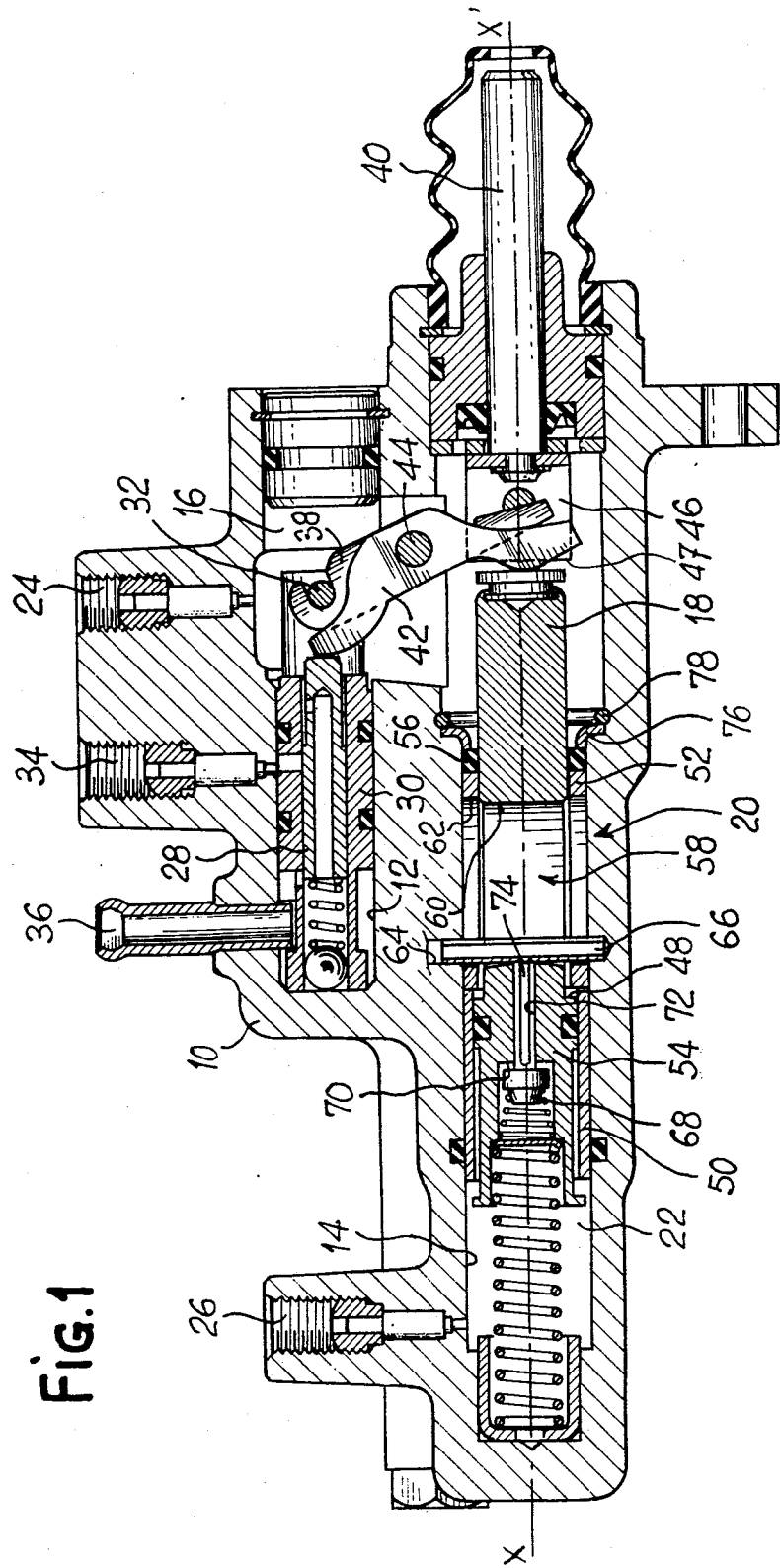
FIG. 1 represents a longitudinal section through a hydraulic servomotor embodying the invention.

The hydraulic servomotor shown in FIG. 1 is a suitable more particularly for braking a vehicle. Its housing 10 contains two bores 12, 14, which in the embodiment are parallel. Both bores give on to a chamber 16 termed the actuating chamber. The bore 14 slidably receives in a fluid-tight manner an assembly of two coaxial pistons 18, 20 which separate the actuating chamber 16 from a chamber 22 termed the utilization chamber, situated at the closed end of the bore 14. The chambers 16, 22 can be connected to two independent sets of brakes in the vehicle orifices 24, 26 respectively. Pressurization of the chamber 16 is effected by way of a distributing valve 28 mounted in a sleeve 30 which is attached to the housing 10 by a slotted tube 36 forming an outlet orifice. The sleeve 30 and valve 28 contain various ducts and ports suitably disposed with respect to an inlet orifice 34, connectible to a high pressure source such as an accumulator, and with respect to a discharge orifice 36 connectible to a low-pressure hydraulic fluid reservoir, so that when the valve is in its idle position as shown in FIG. 1 the chamber 16 communicates freely with the discharge orifice 36. As regards the design and operation of the valve and of the transmission mechanism described below reference may be made to the description given in the U.S. Pat. No. 3,805,671. The valve 28 is controlled by a transmission mechanism with an arm 38 pivoted on a pin 32 and moved by a push rod 40 which can be worked by the driver's pedal. The transmission mechanism also comprises a double sensor 42 pivoted on the arm 38 by way of a pin 44 and having one end bearing on the valve 28 and the other bearing on the servo piston 18. The push rod 40 is coaxial with the piston 18 and projects into the chamber 16, so that the forked end 46 of the push rod can bear on the piston 18 in the event of a failure of assisted braking, as described below. With such a structure, the mechanical transmission operates the distributing valve in response to the relative movement of the push rod and the piston 18.

The inner piston 18 is associated with an annular outer piston 20, the ends of which also project into both the chambers 16 and 22. In this first embodiment of the invention the inner piston 18 has a step 48 such that the inner piston end having the smaller effective cross-section projects into the actuating chamber 16. The outer piston 20 here is made up of two sleeves 50, 52, of which the sleeve 52 has the smaller internal diameter. The first sleeve 50 slides in a fluid-tight manner between the head 54 of the piston 18 and the surface of the bore 14, whereas the second sleeve 52 is associated with a seal 56 to seal off the actuating chamber 16 from a cavity 58 defined by two longitudinal slots 60, 62 provided in the central portion of the piston 18 and in the sleeve 52 respectively. The cavity 58 is connected to a low-pressure hydraulic fluid reservoir by a duct 64, which receives a slotted tube 66 projecting through the ports 60, 62. The head 54 of the inner piston 18 has a central replenishing valve 68 urged into fluid-tight engagement with a seat 70, which surrounds a passage 72 connecting the cavity 58 to the chamber 22. A stem 74 with longitudinal grooves projects into the duct 72; it is attached to the valve member 68 and can abut on the tube 66 and so lift the valve 68 off its seat 70 when the piston 18 is in its idle position, resting on the tube 66. As FIG. 1 shows, the tube 66 also acts as a stop for the annular piston 20, limiting its movement into the actuating chamber 16. Lastly, an additional abutment 76 serving to retain the seal 56 is provided at the open end of the bore 14, where it is held to the housing by a circlip 78.

The servomotor just described operates as follows. When the driver wishes to operate the brakes of the vehicle, he moves the push rod 40 to the left in FIG. 1 from the idle position illustrated, in which its end 46 is resting on the housing. The distributing valve 28 therefore moves, so that the chamber 16 is cut off from the orifice 36 and pressure fluid flows from the inlet orifice 34 to the chamber 16. The pressure rise in the chamber 16 urges the piston 18 to the left in FIG. 1, pushing the stem 74 off its abutment 66 and isolating the fluid in the supply chamber 22 from its reservoir. Another result of the pressure rise is that, since the annular piston 20 has a greater effective cross-section at the end adjoining the chamber 16 than at the end adjoining the chamber 22, this piston 20 will abut on the step 48 on the piston 18 so that it, too, pressurizes the fluid in the chamber 22. Thus the two pistons 18, 20 move in unisson. As regards the operation of the distributing valve 28 and hydraulic servomotor, full details of pressurization of the chamber 16 are given in the above-referenced specification and they will not be repeated here. Note, however, that the stroke ratio of the push rod 40 and piston 18 in the servomotor described herein is equal to unity. In the event of a hydraulic power failure, the lever transmission needs retract only a short distance to bring the end face 47 of the forked end 46 on to the piston 18. In this event the piston 18 alone is moved by the push rod to pressurize the fluid in the chamber 22 since although the piston 20 is hydraulically biased to the right in FIG. 1 the abutments 66 and 76 fixed to the housing limit its movement to the right. During assisted braking the fluid in the chamber 22 is compressed by both pistons combined, over an effective cross-section equal to the cross-section of the bore 14, whereas in the event of a failure of assisted braking the effective cross-section of the piston pressurizing the fluid in the chamber 22 is reduced to that of the head 54 of the piston 18. Thus for a given pressure in the chamber 22 the stroke of the driver's pedal is reduced in the case of assisted braking, whereas in the absence of assisted braking the force required at the pedal is lessened by the reduction in the effective cross-section of the pressure generating piston.

Figure 2:
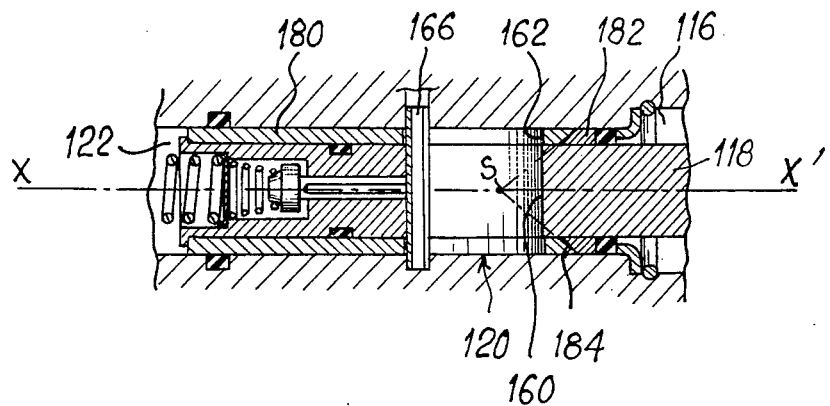
FIG. 2 is a partial longitudinal section through a variant of the invention.
Figure 3:
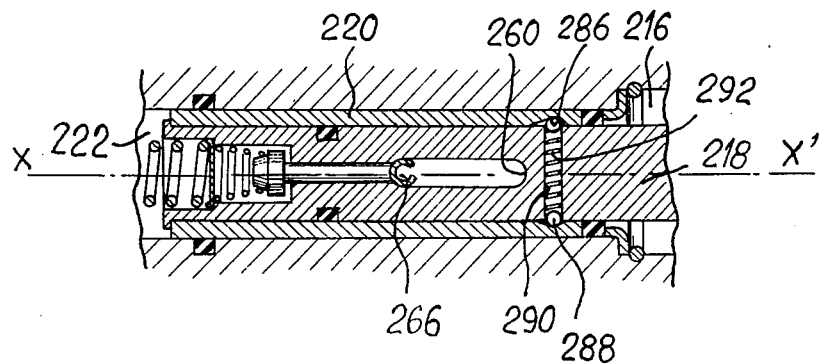
FIG. 3 is a partial longitudinal section through another variant of the invention.

It will be clear from the above that the combination of a stepped annular outer piston with a complementary stepped inner piston defines releasable coupling means which, firstly, permit both pistons 18, 20 to move in unisson when there is assisted braking in the chamber 16, and, secondly, permit the piston 18 to move alone when the latter is operated by the push rod 40 controlled by the vehicle's driver. FIGS. 2 and 3 illustrate two variants of these releasable coupling means, in both of which the two piston are linked by a one-way mechanical locking device. For convenience FIGS. 2 and 3 illustrate two inserts, either of which may be associated with the servomotor shown in FIG. 1 after removing the particular device described above. For simplicity's sake like elements bear the same reference plus 100 and 200 respectively.

The one-way locking device shown in FIG. 2 is as follows. The two pistons 118, 120 have identical effective cross-sections in both chambers 116, 122. The outer piston 120 consists primarily of two sleeves 180, 182 having the same diameter and a common frustoconical contact surface 184, the apex S of the cone being situated on the XX' of the two pistons 118, 120. The sleeve 180 adjoining the chamber 122 also contains a slot 162 into which the tube 166 projects, which again serves to stop the movement of the piston 120 towards the chamber 116. The sleeve 182 adjoining the chamber 116 is in the form of a resilient slotted gripper. When the chamber 116 is pressurized, the two sleeves 180, 182 are urged on to one another, their conical contact surfaces 184 slide on each other, and the sleeve 182 is wedged between the piston 118 and sleeve 180 so that both pistons 118, 120 move in unisson. If the pressure falls in the chamber 116, however, the piston 118 is released and can move alone towards the interior of the chamber 122.

In FIG. 3 the two pistons 218, 220 are seen from above, that is, in section along a plane passing through the axis XX' and perpendicular to the section plane of FIG. 1. The annular outer piston 220 comprises a single sleeve of contant diameter, the inside surface of which contains a groove 286 of asymmetrical bevelled cross-section. At least one connecting element such as a ball 288 housed in a cavity 290 in the piston 218 is urged resiliently into the groove 286. In this embodiment the cavity 290 is a bore containing two balls 288 separated by a coil spring 292. Both pistons, of course, contain longitudinal grooves (of which only one 260 is shown) to receive the tube 266 serving to limit motion of the annular piston 220 towards the chamber 216. As FIG. 3 shows, the asymmetrical cross-section of the groove 286 has a gently sloping side adjoining the chamber 222. If the pressure rise in the chamber 216, the outer piston 220 is urged to the left in FIG. 3, so that the ball 288 jams between the steepside of the groove and the edge of the cavity 290. The two pistons 220, 218 then move in unisson. If the hydraulic power fails, the piston 218 is released by the ball 288 and pushed back in its bore by the effect of the gently sloping side of the groove 286.

What we claim is:

1. In a hydraulic power system including a high pressure source and a low pressure fluid reservoir, a hydrauic servomotor comprising:
    a housing defining an actuating chamber and a pressure chamber and having a bore communicating the actuating chamber and the pressure chamber;
    piston means slidable in said bore and separating the actuating chamber from the pressure chamber;
    said piston means including an outer piston and an inner piston disposed within the outer piston;
    a distributing valve communicating with the high pressure source and the low pressure fluid reservoir to control the pressure in the actuating chamber;
    operator actuating means cooperating with said distributing valve to communicate the actuating chamber with the high pressure source;
    said piston means being responsive to the pressure in the actuating chamber to move in the bore and effect pressurization of said pressure chamber;
    releasable coupling means between the inner piston and the outer piston to permit the inner and the outer pistons to move in unison when the pressure in the actuating chamber is above a predetermind value and to disengage the inner piston from the outer piston when the pressure in the actuating chamber is below the predetermined value and said operator actuating means is engageable with the inner piston to move the inner piston relative to the outer piston;
    abutment means attached to said housing;
    said inner and outer pistons having openings to receive said abutment means to limit the movement of the inner and outer pistons in the bore when said abutment means engages the inner and the outer pistons.

2. The hydraulic servomotor of claim 1 in which said releasable coupling means comprises a complementary step on the inner and the outer pistons to define ends of smaller and larger effective cross-section, said inner piston having its smaller effective cross-section adjoining the actuating chamber, said inner piston smaller and larger cross-sections slidably engaging said outer piston smaller and larger cross-sections, respectively.

3. The hydraulic servomotor of claim 1 in which the outer piston comprises two sleeves, one sleeve being smaller in internal diameter than the other, said sleeves being slidable on the wall of the bore and the inner piston and the sleeve of smaller internal diameter being adjacent the actuating chamber.

4. The hydraulic servomotor of claim 3 in which the sleeve adjacent the actuating chamber includes the opening for the outer piston for receiving said abutment means.

5. The hydraulic servomotor of claim 1 in which the outer piston includes a seal ring adjacent the actuating chamber and slidable on the wall of the bore and the inner piston.

6. A hydraulic servomotor as claimed in claim 1, wherein the releasable coupling means are defined by a one-way mechanical locking device.

7. A hydraulic servomotor as claimed in claim 6, wherein the locking device consists in that the outer piston is made up of two sleeves of identical external and internal diameters but having a common frustoconical contact surface.

8. A hydraulic servomotor as claimed in claim 6, wherein the locking device consists in that the inside surface of the outer piston contains a groove of asymmetrical bevelled cross-section, and in that at least one connecting element installed in a cavity in the inner piston is resiliently urged into said groove.

* * * * *